(No Model.)
Z. M. LINDLEY.
REEL ATTACHMENT FOR HARVESTING AND REAPING MACHINES.
No. 470,061. Patented Mar. 1, 1892.
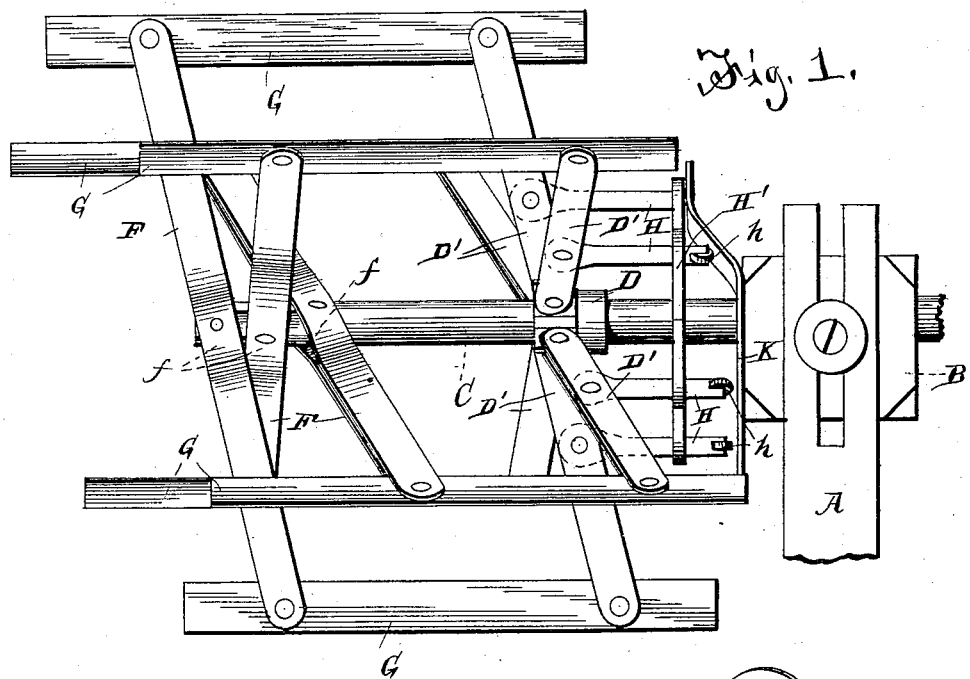
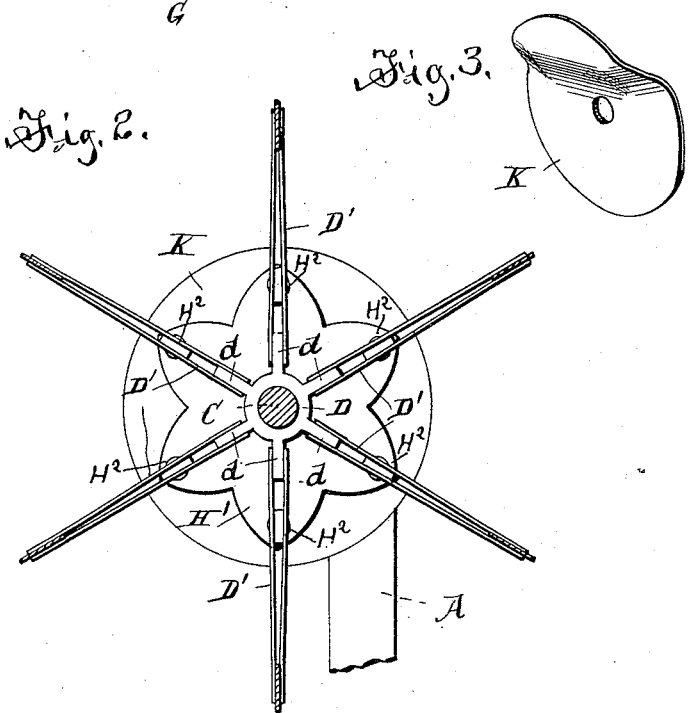
Witnesses
Samuel Ker.
Philip Mari.
Inventor
Zachary M. Lindley.
by E. W. Anderson
his Attorney

UNITED STATES PATENT OFFICE.

ZACHARY M. LINDLEY, OF CARTHAGE, MISSOURI, ASSIGNOR OF ONE-THIRD TO ERNEST B. JACOBS AND VICTOR A. WALLACE, OF SAME PLACE.

REEL ATTACHMENT FOR HARVESTING AND REAPING MACHINES.

SPECIFICATION forming part of Letters Patent No. 470,061, dated March 1, 1892.

Application filed August 14, 1891. Serial No. 402,652. (No model.)

*To all whom it may concern:*

Be it known that I, ZACHARY M. LINDLEY, a citizen of the United States, and a resident of Carthage, in the county of Jasper and State of Missouri, have invented certain new and useful Improvements in Reel Attachments for Harvesting and Reaping Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a vertical transverse section, and Fig. 3 is a perspective detail view of the cam-disk.

This invention relates to reels for harvesting-machines; and it consists in the novel construction and combination of parts, as hereinafter specified.

Owing to the construction and arrangement of the reels now in use in harvesters, it is necessary that the team drawing the machine be connected thereto by whiffletrees at a considerable distance out on the tongue from the machine in order that the reel will clear the team in its operation.

The object of the invention is to so construct the reel that the draft attachment may be set back close to the machine in order to obtain a short close draft.

The important feature of this invention is the provision of a reel wherein its bars or blades will, in addition to their rotary movement, have a laterally-reciprocating movement so controlled that when any reel-arm approaches the zenith of its movement and starts on its down turn, said arm will be withdrawn or pushed grainward a sufficient distance to clear the team, after which it will be again thrown back in position to catch the grain. By this arrangement the doubletree may be set back on the tongue close to the machine, permitting a short close draft.

In the accompanying drawings, the letter A designates the reel-post, having adjustably secured thereto the bearing-block B for the reel-shaft C. Rigidly secured on the shaft C near its inner end is a collar D, having a series of radial lugs or projections $d$, to each of which is pivoted the inner end of an arm D', six such arms being shown. Near the outer end of the shaft are a series of arms F, parallel each with the corresponding arm D' and at their central portions having a loop or eye $f$, through which the shaft C passes, said arms being pivotally secured thereat to said shaft to allow them a movement in a direction parallel with the length of the shaft and with the movement of the arms D'. Pivotally connected to the extremities of the arms F are the reel bars or blades G, which are also respectively and similarly connected to the arms D. These bars or blades are parallel with the reel-shaft and by their pivotal support are capable of a parallel reciprocating movement.

Pivotally connected to each arm D' at its intermediate portion is a rod or plunger H, extending inwardly and working in a guide in a disk H', secured to the shafts, and through which said rods project, carrying each at its inner end an anti-friction roller $h$. In the drawings the disk H' is shown as star-shaped, an aperture or slot $H^2$ being formed in each point, through which the plungers are free to slide, said apertures or slots serving as the guides above referred to. It will be understood, however, that any other suitable form of plate with a series of suitably-located slots or apertures may be used equally well.

K is a cam-disk so arranged that when the respective reel-arms approach the zenith of their movement and start on the down turn said cam will engage the respective plunger or rod H, pushing the reel-arm grainward a sufficient distance to permit it to pass the horse. When said arm has passed the horse, it is thrown stubbleward again to catch the grain by said cam, which at the same time diverts grainward the reel arm or bar, which is above and succeeding it. It will be observed that by reason of the parallel movement of the arms or bars when any bar is pushed grainward the bar directly opposite thereto will be thrown back stubbleward. If desired, the cam may have cog-teeth on its surface which are adapted to engage corresponding teeth on the anti-friction rollers $h$. It is also evident that the operation of the reel, as above described, may be effected by other suitable means, or that the cam might be arranged in various ways for the same purpose, and therefore I do not wish to limit myself to the form shown. The reel may be driven by any suitable connection with the driving-gear of the harvester.

Having described this invention, what I claim as new, and desire to secure by Letters Patent, is—

A harvester-reel comprising a shaft, a series of arms F at the grainward end of said shaft, having a loop or eye at their central portions pivotally secured to said shaft, a series of arms at the stubbleward end of the shaft, pivoted at their inner ends to radial lugs on a collar fast on said shaft, parallel bars or blades connecting the corresponding arms in each series, a rod or plunger secured to each of the stubbleward arms, projecting through a guide-plate, and carrying each a friction-roll, and a cam for reciprocating said rods or plungers, substantially as specified.

In testimony whereof I affix my signature in presence of two witnesses.

ZACHARY M. LINDLEY.

Witnesses:
  J. A. WALLACE,
  E. B. JACOBS.